United States Patent [19]

Stahl

[11] Patent Number: 4,759,858
[45] Date of Patent: Jul. 26, 1988

[54] PROCESS AND APPARATUS FOR THE FORMATION OF A FILTER CAKE

[75] Inventor: Werner Stahl, Landau, Fed. Rep. of Germany

[73] Assignee: Züricher Beuteltuchfabrik AG, Rüschlikon, Switzerland

[21] Appl. No.: 778,431

[22] Filed: Sep. 20, 1985

[30] Foreign Application Priority Data

Oct. 24, 1984 [DE] Fed. Rep. of Germany ....... 3438941

[51] Int. Cl.⁴ ...................... B01D 33/36; B01D 37/00; B01D 39/08
[52] U.S. Cl. .................................. 210/771; 210/391; 210/411; 210/489; 210/386; 210/500.1
[58] Field of Search .............. 210/355, 391, 393, 404, 210/411, 412, 489, 499, 500.1, 768, 791, 798, 770, 386, 490, 491, 492, 503, 504, 505, 506, 507, 508, 771, 808

[56] References Cited

U.S. PATENT DOCUMENTS

| | | | |
|---|---|---|---|
| 1,700,772 | 2/1929 | McCaskell | 210/412 |
| 2,332,917 | 10/1943 | Jordan et al. | 210/411 |
| 3,096,279 | 7/1963 | Komline | 210/404 |
| 3,747,770 | 7/1973 | Zentis | 210/489 |
| 3,968,287 | 7/1976 | Balk | 210/500.1 |
| 4,038,187 | 7/1977 | Saffran | 210/411 |

FOREIGN PATENT DOCUMENTS 326154 1/1958 Switzerland.
687968 2/1953 United Kingdom.

Primary Examiner—Benoit Castel
Assistant Examiner—Linda S. Evans
Attorney, Agent, or Firm—Fleit, Jacobson, Cohn & Price

[57] ABSTRACT

The invention relates to an improved process and apparatus to produce a filter cake formed by retained solids collected on a filter cloth during filtering. Accordingly, the filter cake is sub-divided into a plurality of filter cake elements which are kept separate from each other at predetermined distances. Further, impermeable zones on the filter cloth are formed around the filter cake elements. The filter cake elements and the impermeable zones are of a size that the filter cake elements can freely contract in any plane without cracking, while the filter cloth between the filter cake elements is covered by the impermeable zones.

7 Claims, 1 Drawing Sheet

PROCESS AND APPARATUS FOR THE FORMATION OF A FILTER CAKE

BACKGROUND OF THE INVENTION

The present invention relates to a process for the formation of a filter cake on a porous filter material, particularly on a filter cloth, in which with the aid of different gas pressures on either side of the filter material when the filtrate passes through the pores of the filter material, solids particles are separated from a suspension and deposited on the filter material and in which the filter cake enriched with the filtrate is at least partly dried with the aid of gas passed through the filter cake.

Such a process is known from U.S. Pat. No. 2,332,917. The known apparatus is used for arranging a relatively coarse screen in the form of a supporting fabric beneath the filter cloth, so as to limit the bulging of the latter when a compressed air shock is used for ejecting the filter cake.

There is a fundamental risk that the filter cake will crack during the drying phase, air penetrating through the cracks and cloth, so that the vacuum collapses or significantly decreases. As soon as cracks appear, the filter cake remains wet, i.e. the further suction drying of the filter cake stops immediately following the formation of the cracks. This effect is also disadvantageous if such a filter cake also has to be washed. The washing liquid is substantially only sucked through the cracks, because they take the path of least resistance. The only solution is to bring the product to the desired purity by intermediate mashing several times.

In extreme cases crack patterns form on the cake surface. Thin filter cakes have a lesser tendency to cracking than thick filter cakes of the same material. The cracks can then pass completely through the filter cake up to the filter cloth.

As the cracks are prejudicial during the washing and suction drying for the aforementioned reasons, attempts have hitherto been made to remedy this problem in the case of continuous filters (drum/belt filters), in that they are pressed together by press rolls or belts. In the case of horizontal filtration using plate or belt filters, through feeding the suspension on a number of occasions onto the already predried and therefore cracked filter cake, it is possible to make good the cracks by a filtering-in solid. However, it is possible to prove with dye tests that the porosity of the subsequently filtered-in material is higher than that of the original material. This leads to a certain inhomogeneity of the cake with the corresponding disadvantages. This possibility does not exist with disk filters, so that the cracks cannot be eliminated.

If this is known when designing the installation, no disk filters can be used and instead it is necessary to employ drum filters with the aforementioned press rolls or belts, which leads to higher and in fact roughly double the costs.

Another possibility of stopping cracks is to add small amounts of solids, e.g. pulp or glass fibers to the suspension to be filtered, but this is seldom possible for the reasons of the purity of the material or costs.

SUMMARY OF THE INVENTION

The problem of the present invention is to provide a possibility so that the filter cake can freely contract in any plane so as to avoid cracking or, if a minimum cracking can be accepted, to control same with respect to size and alignment.

According to the invention this problem is solved in that:
(a) impermeable zones are formed for the filtrate between predeterminable areas on the filter material,
(b) the zones which are impermeable for the filtrate in each case surround a limited geometrical area on the filter material,
(c) in each limited geometrical area a filter cake element is formed and is kept separate from adjacent filter cake elements, and
(d) the size of the filter cake elements is made so small that, whilst taking account of the particular product characteristics, no cracking occurs in the filter cake within an individual filter cake element during filter cake shrinkage occurring during the drying of the filter cake.

Particularly preferred embodiments of the process according to the invention provide for the filter cake elements to be round, oval, hexagonal or in the form of a tire tread. Corresponding filter cloths can be manufactured relatively easily and the size of the individual filter cake elements in these embodiments of the inventive process can easily be adapted to the particular demands.

According to a further preferred embodiment of the invention, the zones on the filter medium which are impermeable for the filtrate are formed in that pressure-strengthened zones are formed in the filter cake. In this preferred embodiment a normal filter cloth can be employed.

A particularly preferred apparatus for performing the process according to the invention is characterized in that
(a) a filter cloth has zones impermeable for the filtrate between predeterminable areas,
(b) the zones impermeable for the filtrate in each case surround a limited geometrical area on the filter cloth,
(c) in each limited geometrical area a filter cloth element is formed, which is separate from adjacent filter cloth elements and
(d) the size of the filter cloth elements is so small, that taking account of the particular product characteristics within an individual filter cloth element no cracking occurs in the filter cake during filter cake shrinkage occurring during the drying of the filter cake.

For many practical uses, the arrangement can be selected in such a way that the impermeable zones have a reciprocal spacing, which corresponds to roughly twice the height of the sought filter cake. Thus, cracking can be prevented without losing a significant surface area.

According to a further preferred embodiment of the apparatus according to the invention, the filter cloth elements are round, oval, hexagonal or are formed like a tire tread. Such an apparatus leads to the advantage that, in the case of simple manufacture the dimensioning can easily be varied as a function of the particular product.

Preferably, the impermeable zones are produced by a waterproof substance, such as e.g. silicone, rubber or the like applied to or introduced into the filter cloth. Thus, a filter cloth for the apparatus according to the invention can be manufactured relatively simply and inexpensively.

It can be appropriate and simple for some filter cloth materials to blend together additional fibers of a filter cloth to form impermeable zones.

For certain filter materials, a filter cloth according to the invention can be manufactured in a technologically advantageous manner in that in the impermeable zones a foil impermeable for the filtrate is applied to the filter cloth.

Finally, a flat material impermeable for the filtrate is preferably applied to the filter cloth and has bores for the passage of the filtrate in the limited geometrical areas of the filter cloth elements. Such an arrangement can be particularly advantageous if very thin filter cloths are used, which permit little or no transverse filtration within the filter cloth.

DESCRIPTION OF THE PREFERRED EMBODIMENTS RELATIVE TO THE DRAWINGS

Figure 1:
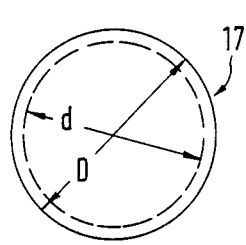
FIG. 1 is a schematic view of a round filtered-on filter cake element with indicated filtering area.

In FIG. 1 the diameter of a filtered cake element 17 is labeled by D, which has the form of a circle. The diameter d of the filtering surface is preferably equally spaced from the periphery of the filer cake element; the unfilterable ring zone built thereby should be kept as small as possible. This realization is not as favorable as the proposal according to FIG. 2, since the filtering surface is unnecessarily reduced in the wedges.

Figure 2:
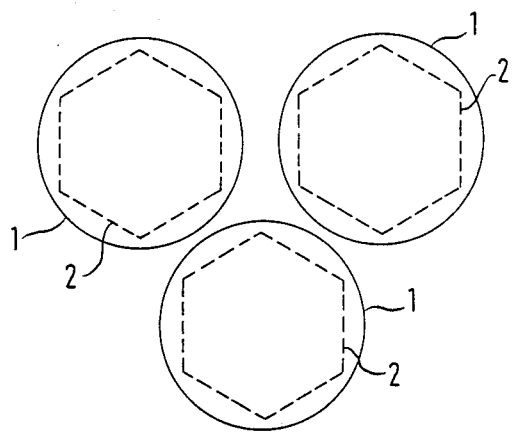
FIG. 2 is a similar arrangement as shown in FIG. 1, whereby the filtering area shows hexagonal form.

The filter cake elements according to FIG. 2 are more favorable since the hexagonal surrounding of the filtering surface 2 offers a more favorable arrangement with less loss of filtering surface areas. Profile 1 of the formed filter cake element is hereby circular, too. In most cases, the filter cake elements are not arranged symmetrically to each other.

Figure 3:
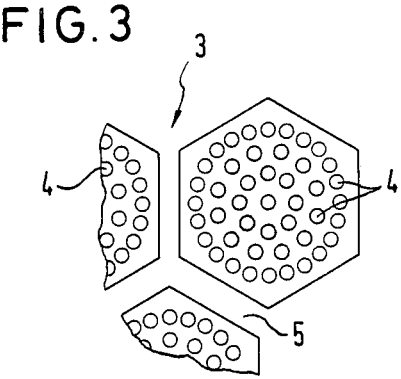
FIG. 3 is a schematic view of a honeycomb-like, perforated support, whereby the edges remain unperforated, usable particularly for very thin filter cloths.

If very thin filter cloths are used, which only allow a little or no transverse filtration within the filter cloth thickness, it is sufficient to support the thin filter cloth, e.g. on a honeycomb-like substrate, so that no filter cake can be filtered on there. It is possible to use supporting disks or shims 3 (see FIG. 3) with bores 4 of the same or different sizes and which are only provided within the hexagonal window. The edges remain unperforated, so that non-filtering zones 5 are formed, so that the filter cake elements according to the invention are constituted.

Instead of the honeycomb-like perforated shims, the same effect can be achieved with supporting fabric. The latter is only perforated on the surfaces within the hexagon. In this way the sealing function is transferred from the cloth into the substrate or supporting fabric.

Figure 4:
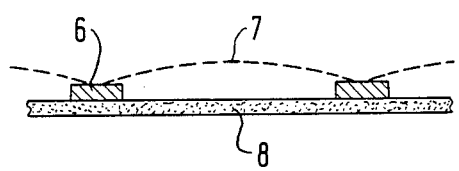
FIG. 4 is a principle outline of a section of a filter cake element on a filter cloth with fabrics arranged between the filter cake elements and made out of non-filtering material, whose thickness is smaller than the thickness of the filter cake element.

The fabric 6 made from non-filtering material in FIG. 4 has a significant thickness, but the latter is less than the filter cake thickness. The filter cake elements 7 according to the invention are performed through said fabric 6 on filter cloth 8.

Figure 5:
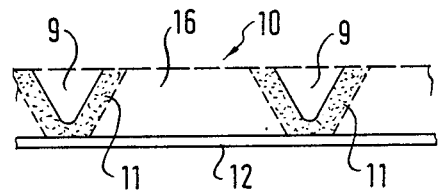
FIG. 5 is a schematic sectional view of a filter cake with a profile pressed on its surfaces, pressure-strengthened zones are formed dividing the filter cake into filter cake elements.

A further inventive idea is reproduced in FIG. 5. For example a honeycomb structure can be pressed into the filter cake 10 on filter cloth, i.e. the filter cloth 12 can be left and filtered on over its entire surface area and honeycomb profiles can be pressed on, e.g. by a roller. As a result of the pressed-in inventive surface 9, the attached or added material is strengthened, so that pressure-strengthened zones 11 are formed, between which are constituted the inventive filter cake elements 16.

The filter cake elements can have a geometrical shape such that on the one hand the filtering surface is relatively large and the edge loss is at a minimum and on the other hand the edge is sufficiently large for the cake not to overlap.

Figure 6:
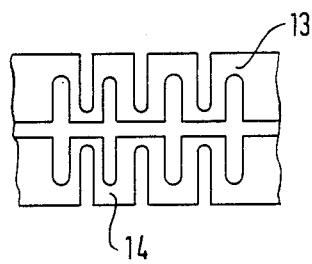
FIGS. 6 and 7 are schematic views of a filter cake, each of which is divided into filter cake elements by tire tread similar forms, so that possible crack locations are formed (controlled crack locations).
Figure 7:
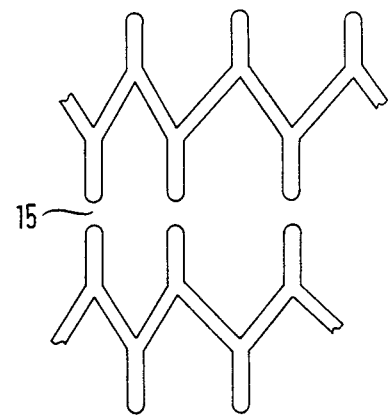

According to a further development of the invention, in certain circumstances slight cracking could be allowed, but must be controllable by corresponding profiling. Such profile configurations are shown in FIGS. 6 and 7 and can be made uniform (i.e. symmetrical) or non-uniform. These profiles are similar to tire treads. By corresponding design, equally or unequally large cracking zones 13, 14, 15 can be formed.

Thus, cracking is permitted at those points where no filtration is possible under the cloth. In other words cracking is permitted where in any case no air can be passed through the cloth.

What is claimed is:

1. A process for the formation of a filter cake on a porous filter material, in which with the aid of different gas pressures on either side of the filter material when a filtrate passes through the pores of the filter material, solids particles are separated from a suspension and deposited on the filter material and in which the filter cake enriched with the filtrate is at least partly dried with the aid of gas passed through the filter cake, said process comprising:
   forming impermeable zones for the filtrate between predetermined areas on the filter material by forming pressure-strengthened zones in a filter cake, said pressure-strengthened zones dividing the filter cake into filter cake elements which are separate from adjacent filter cake elements, and
   maintaining the size of the filter cake elements sufficiently small so that cracking is avoided in each of the filter cake elements which make up the filter cake during filter cake shrinkage occurring during the drying of the filter cake.

2. Process according to claim 1, wherein said pressure-strengthened zones are pressed by a roller.

3. Process according to claim 1, wherein said pressure-strengthened zones have a honeycomb structure.

4. Process according to claim 1, wherein at least two filter cake elements are interconnected by openings in said pressure-strengthened zones in which cracking is controlled by the shape of the openings.

5. Process according to claim 1, wherein said pressure-strengthened zones have a profile configuration in the shape of tire treads.

6. Process according to claim 1, wherein said pressure-strengthened zones are formed by pressing V-shaped zones into the filter cake.

7. An apparatus for forming a filter cake from a filtrate, said apparatus comprising:
a filter cloth,
means defining impermeable zones for the filtrate located between predetermined areas of said filter cloth, said impermeable zones substantially surrounding a plurality of limited geometrical areas on said filter cloth for forming a filter cake element in each of said limited geometrical areas, and
at least two adjacent geometrical areas being interconnected by means defining predetermined cracking zones formed in said impermeable zones, said predetermined areas of said filter cloth being of a size so small that cracking is avoided in the filter cake during filter cake shrinkage occurring during the drying of the filter cake except in said predetermined cracking zones.

* * * * *